United States Patent [19]

Johnnie et al.

[11] 4,134,735
[45] Jan. 16, 1979

[54] SULFUR RECOVERY PLANT

[75] Inventors: James L. Johnnie, Long Beach; Peter J. DeKluyver, Fullerton, both of Calif.

[73] Assignee: Continental Oil Company, Ponca City, Okla.

[21] Appl. No.: 845,017

[22] Filed: Oct. 25, 1977

[51] Int. Cl.² .......................... B08B 5/00; B08B 7/04; B08B 9/02; C01B 17/02
[52] U.S. Cl. ................................ 422/188; 15/316 R; 134/21; 134/22 C; 134/37; 423/574 R; 422/183
[58] Field of Search .................. 23/262; 423/573, 574; 134/22 C, 34, 37, 21; 122/391, 390; 15/316 R, 337; 137/15, 237

[56] References Cited

U.S. PATENT DOCUMENTS

| | | | |
|---|---|---|---|
| 1,836,101 | 12/1931 | Young | 15/406 |
| 2,974,071 | 3/1961 | Morris | 134/22 C X |
| 3,156,584 | 11/1964 | Yardin | 134/22 C X |
| 3,532,468 | 10/1970 | Beavon | 23/262 X |
| 3,630,212 | 12/1971 | Martin | 134/22 C |
| 3,719,744 | 3/1973 | Servasier | 423/574 G |
| 3,957,508 | 8/1976 | Richardson et al. | 423/573 R X |

*Primary Examiner*—Joseph Scovronek
*Attorney, Agent, or Firm*—Richard W. Collins

[57] ABSTRACT

A sulfur recovery plant such as a modified Claus plant is provided with a source of pressurized liquefied inert gas and heating means, and the piping arranged so that the pressurized gas formed can be used to clean out plugs which form in the sulfur piping.

4 Claims, 2 Drawing Figures

SULFUR RECOVERY PLANT

BACKGROUND OF THE INVENTION

1. Field of the Invention

This invention relates to sulfur recovery plants of the type used to remove hydrogen sulfide from gas streams.

Removal of hydrogen sulfide from gas streams in refineries and natural gas plants has received increasing attention due to concern about atmospheric pollution. The most prevalent method for removing hydrogen sulfide is the well-known modified Claus process, which removes hydrogen sulfide by converting it to elemental sulfur. In the modified Claus process, hydrogen sulfide is partially combusted with air in a reaction furnace to form sulfur dioxide. The combustion gases are cooled in a waste heat boiler in which a portion of the uncombusted hydrogen sulfide reacts with sulfur dioxide to form elemental sulfur and water vapor. The partially converted mixture then flows to a condenser where the elemental sulfur is removed in molten form. The remaining gases are then heated and passed over a catalytic converter bed for further conversion to elemental sulfur and then again cooled to condense incremental sulfur. From one to four stages of reheat, conversion and condensing are typically used. A coalescer is usually provided to remove entrained liquids (sulfur) from the final condenser tail gas. In many cases, a tail gas cleanup unit such as the well-known SCOT unit is utilized to clean up the tail gas from the modified Claus process.

In the modified Claus unit, provisions are made to remove liquid sulfur from each vessel in which condensation of sulfur may occur. Sulfur condensation may be due to intentional design, poor operation, or equipment oversizing. Vessels in which sulfur condensation may occur include the waste heat boiler, condensers, reaction converters and the coalescer. Sulfur is generally removed from these units through sulfur piping and sulfur seal legs into a sulfur accumulator. The sulfur seal legs provide a liquid seal against the pressure established in the sulfur recovery equipment, as it is necessary to prevent toxic gas from passing into the sulfur accumulator where it might be vented to the atmosphere.

2. The Prior Art

In sulfur recovery plants, plugging of the sulfur piping with solid sulfur frequently occurs. The sulfur piping is generally steam jacketed in order to prevent formation of solid sulfur, but nevertheless such sulfur solidification frequently occurs at various points in the sulfur piping. Additionally, plugging can occur from accumulations of iron oxide, catalyst or a combination of these materials and sulfur.

The conventional manner of providing for removal of solid plugs from sulfur piping involves installation of cross-connections at each direction change in the sulfur piping. In other words, instead of an ordinary elbow in the piping, a cross-connection having four nozzles is generally utilized, and two adjacent nozzles are covered with blind flanges. In the event of a solid plug forming, the conventional procedure is to remove a blind flange from the cross-connection and break up the plug by striking it with a solid rod inserted through the blind flange opening. In many instances, union regulations require that a pipefitter remove the blind flanges, and this can produce a delay before the pipefitter is available during which poor operation, pollution, or a unit shutdown can result. Shutdown of a modified Claus sulfur recovery unit can result in the shutdown of all units producing hydrogen sulfide, and this can seriously disrupt refinery or gas plant operations.

The above-described method of removing solid plugs from the sulfur piping can also result in a serious safety hazard due to exposure of workmen to the highly toxic hydrogen sulfide gas which is prevalent throughout the plant.

U.S. Pat. Nos. 437,987 and 1,836,101 relate to cleaning of boiler tubes with steam directed through the boiler tubes. U.S. Pat. No. 3,936,892 describes a plumbing fitting including an arm joining a line, the arm having provision for connection to high pressure fluid or in the alternative to a cleanout rod. None of the prior art devices or procedures noted above provide a satisfactory solution to the problem of clearing plugs from sulfur piping in a sulfur recovery plant.

SUMMARY OF THE INVENTION

According to the present invention, an inert gas system is provided for applying gas pressure to a plugged section of sulfur piping to remove the plug. The inert gas system includes a source of liquefied inert gas stored under pressure and connected through appropriate valving to the blind flanges of the cross-connections normally used at each direction change in the sulfur piping. A heating means is provided for gasifying the liquefied inert gas when it is to be utilized. This invention provides a means for isolating a plugged section of sulfur piping and applying high pressure inert gas to it to force the plug from the piping.

In some cases, gas pressure is not sufficient to break the plug loose, and it is necessary to revert to the technique of inserting a rod into the piping to manually break up the plug. Therefore, in accordance with one embodiment of the invention, provision is made for inserting a clean-out rod through a bushing and packing gland through the blind flange so that the piping can be rodded out without releasing a large amount of toxic gas to the atmosphere.

The advantages provided by this invention are that an operator can take action to remove a plug immediately, and the application of pressurized gas has been very successful in removing plugs shortly after they are formed. If the pressurized gas does not accomplish the plug removal, the bushing and packing gland permit rodding without opening the entire piping to the atmosphere, greatly reducing the safety hazard to workers in the area. The ability to remove plugs immediately upon formation greatly facilitates operation of the sulfur recovery plant, reduces pollution, and reduces the toxic gas hazard.

DESCRIPTION OF THE PREFERRED EMBODIMENT

This invention has utility in any situation in which liquid sulfur is piped from a process vessel to an accumulator or storage pit. Generally, it is preferred to maintain the piping configuration as short as possible and with as few direction changes as possible to minimize the opportunity for plug formation. Sulfur piping usually consists of two vertical pipe sections with a connecting generally horizontal but slightly downwardly sloping connecting section. The downward slope enables the sulfur to flow due to gravity, as it is not practical to pump the liquid sulfur. In many cases more than two direction-changing fittings are required because of plant layout and other factors, although the number of direction changes should be minimized.

Figure 1:
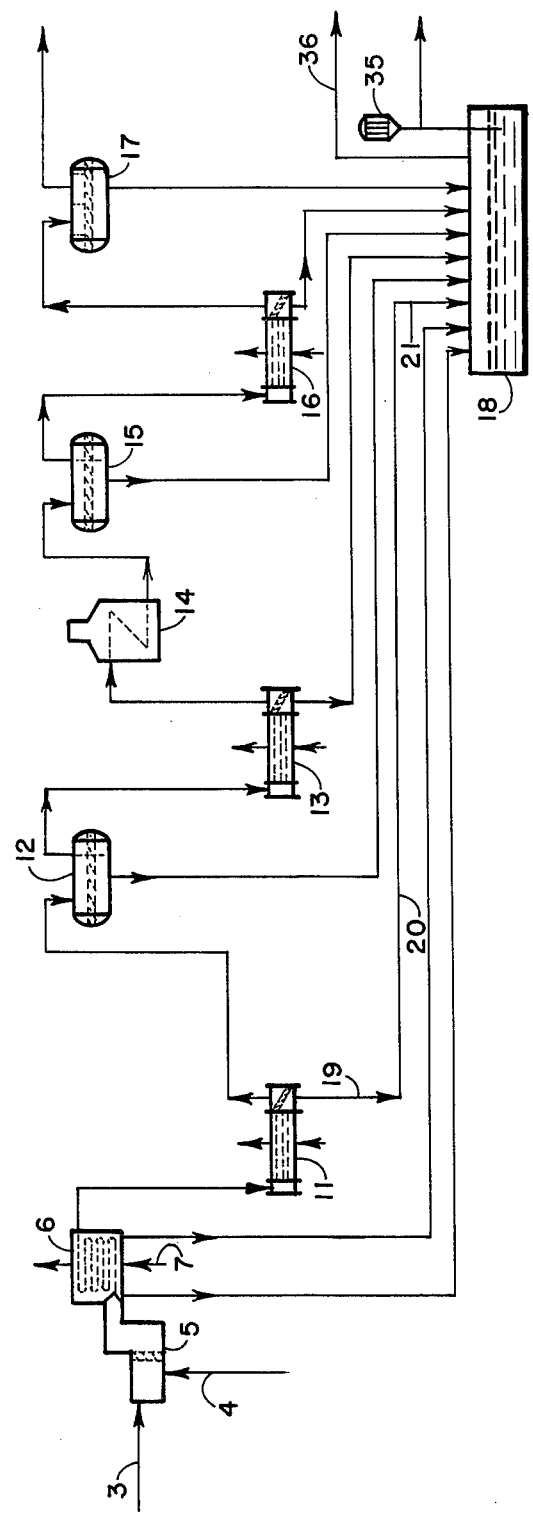
FIG. 1 is a schematic flow sheet illustrating a conventional sulfur recovery plant.

A conventional modified Claus sulfur recovery plant is illustrated in FIG. 1. The plant does not form a part of the invention, but illustrates the type of equipment to which the invention is applicable. The invention is equally applicable to tail gas cleanup units and any other process equipment with substantial gravity flow sulfur piping.

As shown in FIG. 1, hydrogen sulfide-containing gas from line 3 and air from line 4 are introduced to a reaction furnace 5 where partial combustion takes place. The combustion products flow to waste heat boiler 6 where partial conversion to elemental sulfur occurs and where boiler feed water from line 7 is converted to steam. The combustion products then pass to condenser 11 where elemental sulfur is condensed. Uncondensed combustion products are then reheated by appropriate means (not shown) and passed to a first reactor 12 where additional sulfur is formed. Condensation of sulfur, reheating of the gas stream and additional conversion are carried out in second condenser 13, heater 14 and second reactor 15. Gas from second reactor 15 passes to third condenser 16 and then to coalescer 17. Tail gas from coalescer 17 then flows to a tail gas cleanup unit (not shown).

Sulfur piping extends from each condenser, each reactor and the coalescer to an accumulator or storage pit 18 equipped with a gas vent and a delivery pump. In practice, as mentioned previously, all sulfur piping is as short as convenient and has as few direction changes as is practical. Typical sulfur piping is illustrated by vertical section 19 extending from first condenser 11, horizontal downwardly sloping section 20 and vertical section 21 extending to the sulfur storage pit 18.

Figure 2:
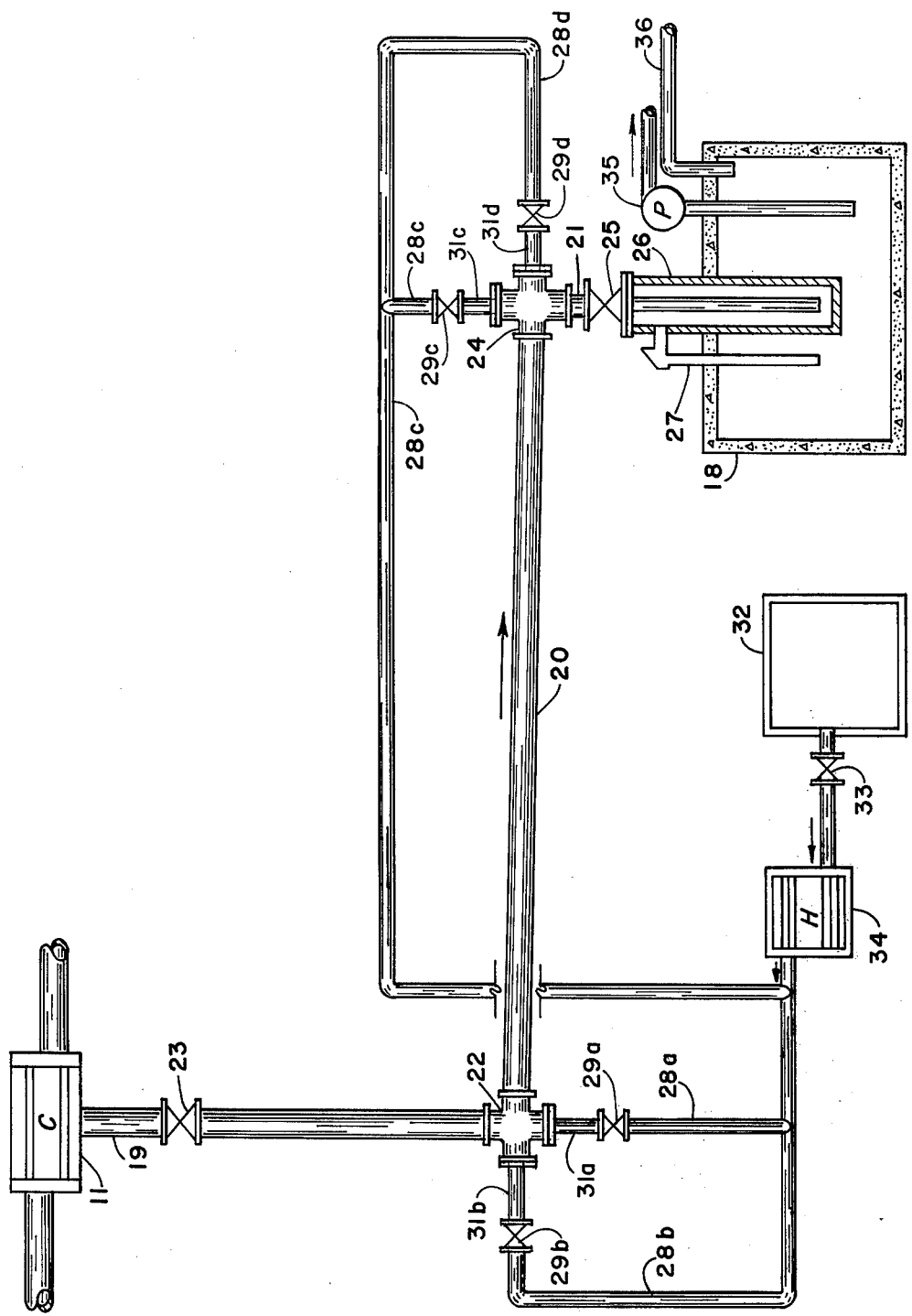
FIG. 2 shows a section of sulfur piping including plug removal means in accordance with the invention.

The details of a typical sulfur piping configuration as described generally above are illustrated in FIG. 2. In this view, vertical piping section 19 extends downwardly from condenser 11 to a cross-connection 22, and includes a block valve 23 between condenser 11 and cross-connection 22. Horizontal piping section 20 extends from one nozzle of cross-connection 22 to a second cross-connection 24. Piping section 21 extends from one nozzle of cross-connection 24 through a block valve 25 to sulfur seal leg 26 which overflows through passage 27 into sulfur pit 18. A delivery pump 35 and vent 36 are provided for sulfur pit 18.

Inert gas lines 28a, 28b, 28c and 28d are connected through inert gas valves 29a, 29b, 29c and 29d to the sulfur piping through two adjacent nozzles of each of the cross-connections 22 and 24.

In the event that gas pressure is not effective in removing a plug in the sulfur piping, one of lines 28a, 28b, 28c or 28d can be removed from its respective valve, and a rod can be inserted through the valve to break up the plug. Piping sections 31a, 31b, 31c and 31d contain packing glands to provide a gas seal and minimize gas leakage during insertion of a cleanout rod through the valve.

It will be appreciated that additional valving and piping might be desired to provide more flexibility to the unit, but the equipment as described is illustrative of this aspect of the invention. In some cases, the provision for cleanout rods may be deleted, but it is preferable to have this backup capability.

The plug-removing gas is stored under pressure of from 10 to 25 kg/cm$^2$ in a liquefied inert gas storage vessel 32. Nitrogen is the preferred inert gas for practical reasons. Upon formation of a plug in the piping, liquefied inert gas is fed through valve 33 to heater 34 where it is vaporized. The gas is then used as described below to remove plugs from the sulfur piping.

The operation of a sulfur recovery plant incorporating the invention will now be described with reference to FIG. 2. During normal operation, liquid sulfur flows from condenser 11, down pipe section 19 through valve 23 to cross-connection 22, down sloped pipe section 20 to cross-connection 24, down pipe section 21 through valve 25 into sulfur seal leg 26, and finally out seal leg overflow passage 27 to storage pit 18. In the event of a plug forming in pipe section 20, valve 23 in line 19 is closed to isolate the upstream process equipment from the pressurized gas to be injected into the sulfur piping. Liquefied inert gas from gas storage tank 32 is passed through valve 33 to heater 34 where it is vaporized. Gas valve 29a and/or 29b is opened, and pressurized inert gas is injected into the sulfur piping to break up the plug. Assuming satisfactory removal of the plug, gas valves 29a and/or 29b and 33 are closed and pressure is bled off, preferably through the sulfur seal leg 26. Valve 23 is then opened, and normal operations are resumed.

In the event that the gas pressure does not satisfactorily remove the plug, piping 28b or 28d is disconnected, and valve 29b or 29d is opened and a rod inserted through the valve and the packing gland in extension 31b or 31d. The rod is used to physically break up the plug, after which the rod is removed, valve 29b or 29d is closed, piping 28b or 28d is reconnected, valve 23 is opened, and normal operations are resumed.

It will be apparent that the exact sequence of steps will vary depending on the location of the plug and other variables.

Safety and operating considerations limit the amount of gas pressure to be used to an upper limit in most cases of about 25 kg/cm$^2$, although in most cases if the plug is noticed early lower pressures will suffice.

The use of a source of liquefied inert gas is preferred over simply using a pressurized cylinder of gas. It is much easier to apply a useful amount of inert gas using the system according to the invention.

The foregoing detailed description of the structure and operation in accordance with the preferred embodiment of the invention is intended to be illustrative rather than limiting. Numerous variations and modifications within the true scope of the invention will be apparent to those skilled in the art upon consideration of the foregoing description.

We claim:

1. In a sulfur recovery plant comprising a vessel in which liquid sulfur is formed, sulfur piping including a plurality of direction-changing connections extending from said vessel to a sulfur seal leg adapted to maintain a gas seal between said piping and a sulfur accumulator into which liquid sulfur from said seal leg empties, and valve means in said sulfur piping for isolating selected sections thereof, the improvement comprising;
   (a) inert gas valve means at each direction changing connection of said sulfur piping;

(b) a pressurized liquefied inert gas supply means including piping extending from said supply means to each of said inert gas valve means; and (c) heating means on the inert gas piping for heating said pressurized liquefied inert gas to gasify same whereby plugs forming in said sulfur piping can be subjected to pressure from said pressurized inert gas to remove said plugs.

2. A sulfur recovery plant as defined in claim 1 wherein each of said direction-changing connections is a cross-connection having four nozzles.

3. A sulfur recovery plant as defined in claim 1 wherein said sulfur piping includes a first downwardly extending section from said vessel, a generally horizontal but slightly downwardly sloped section extending from said first downwardly extending section to a second downwardly extending section extending to said seal leg, and a cross-connection at each end of said generally horizontal section.

4. A sulfur recovery plant as defined in claim 1 wherein said plant includes a plurality of vessels each having sulfur piping and inert gas valve means associated therewith.

* * * * *